United States Patent [19]

Heitmann

[11] Patent Number: 4,458,272
[45] Date of Patent: Jul. 3, 1984

[54] METHOD OF RECORDING VIDEO SIGNALS WITHIN A PREDETERMINED BIT/UNIT TIME RECORDING RATE

[75] Inventor: Jürgen Heitmann, Seeheim, Fed. Rep. of Germany

[73] Assignee: Robert Bosch GmbH, Stuttgart, Fed. Rep. of Germany

[21] Appl. No.: 323,393

[22] Filed: Nov. 20, 1981

[30] Foreign Application Priority Data

Nov. 27, 1980 [DE] Fed. Rep. of Germany ....... 3044624

[51] Int. Cl.³ .......................... G11B 5/00; G11B 5/09
[52] U.S. Cl. .......................................... 360/8; 360/51
[58] Field of Search ..................... 360/36, 39, 51, 8, 32

[56] References Cited

U.S. PATENT DOCUMENTS 3,860,760  1/1975  Rittenbach ............................. 360/8
4,141,039  2/1979  Yamamoto ............................. 360/8
4,318,137  3/1982  Cordova et al. ....................... 360/32

*Primary Examiner*—Vincent P. Canney

*Attorney, Agent, or Firm*—Frishauf, Holtz, Goodman & Woodward

[57] ABSTRACT

To store digital data on a magnetic tape at a bit rate which does not exceed the storage capabilities of the tape of about 80 Mbit/s, although received digital video signals have a bit rate of about 200 Mbit/s, the video signals are split into two channels and applied to a head wheel having four transducer heads, and the bits are applied to the transducer heads in time-expanded form, with the wrap angle of the tape exceeding 180°, time expansion being carried out at a rate related to the excess wrap angle, so that the track of recording will have a smaller recording angle ($\beta 2$) than heretofore ($\beta 1$), the time-expanded signals being recompressed upon reproduction. Time compression and expansion is preferably carried out by buffer memories which have data entered and read-out in the FIFO method, at respectively different clock rates, switched under control of a control unit (26) which receives head wheel position input signal information.

9 Claims, 4 Drawing Figures

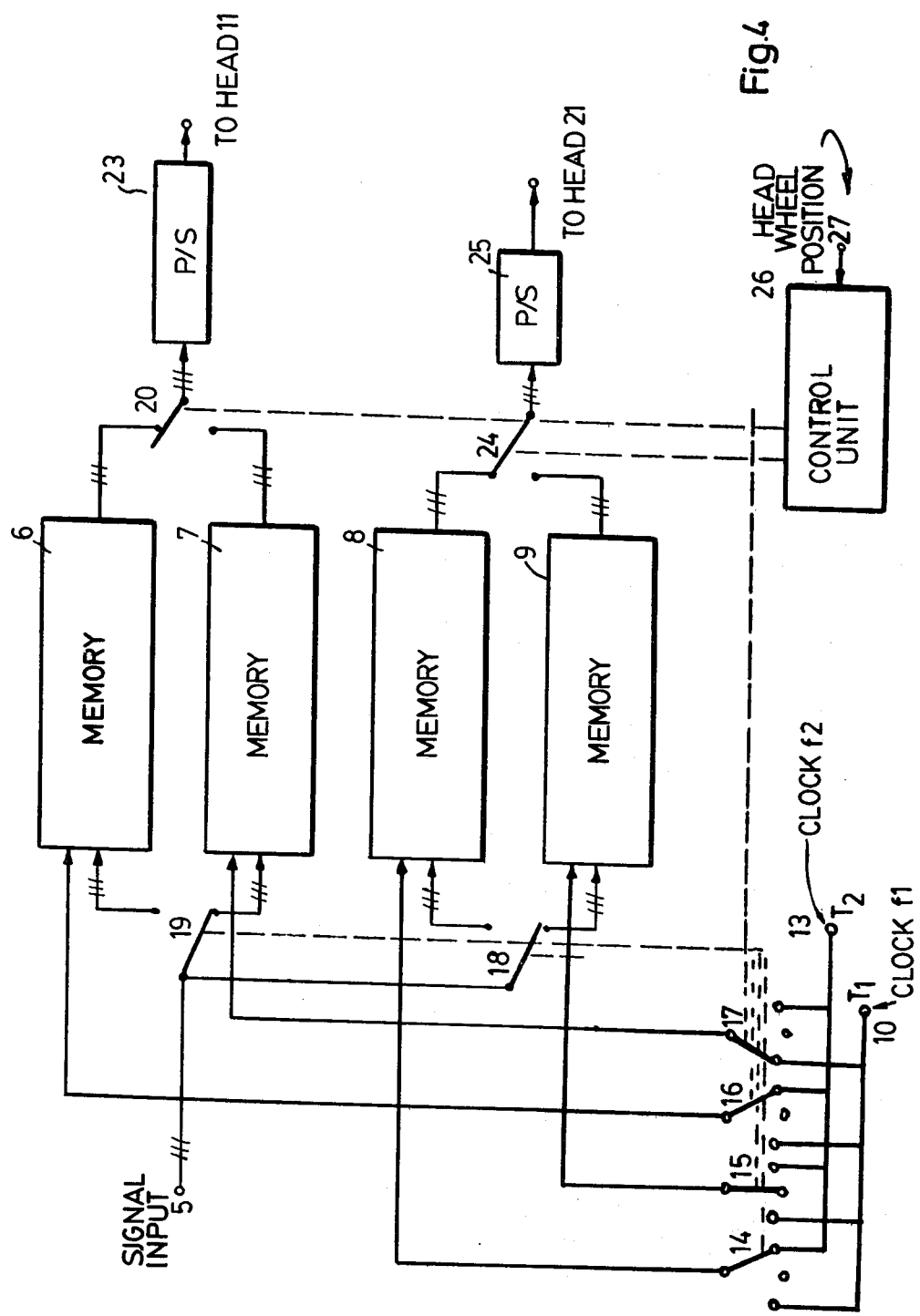

METHOD OF RECORDING VIDEO SIGNALS WITHIN A PREDETERMINED BIT/UNIT TIME RECORDING RATE

The present invention relates to the recording of digitally encoded video data on a recording medium such as magnetic tape, in which a head wheel rotates in a gap of a recording cylinder about which the tape is guided in a spiral path, so that recorded tracks which are inclined with respect to the major axis of the tape will be formed thereon.

BACKGROUND

Various types of inclined track recording systems and methods are known, in which the tape is looped about a recording cylinder or drum with a looping angle of about 180°. The digitized video signal is distributed to a plurality of channels and is recorded with several magnetic heads on adjacent magnetic tracks. The number of magnetic recording heads rises with the number of channels. Thus, to keep the number of recording heads and thus the construction of the recording transducer unit reasonably simple, the number of channels should be as low as possible. A suitable number is two channels, which is most desirable.

Data rates of digital video signals may be in the order of 200 megabits per second (200 Mbit/s); this means that the data rate of 100 Mbit/s per channel will be needed, which means a band width of about 50 MHz. Currently used recording speeds, however, cause an unacceptable increase in wear of the head, wear on tapes, and errors if a recording rate of about 80 Mbit/s is exceeded.

THE INVENTION

It is an object to provide a method of recording at a rate of 200 Mbit/s in a two-channel multiplex system with acceptable error rates, without recording, within one channel, at a rate over 80 Mbit/s.

Briefly, the signals are time-transformed in the recording/reproduction process; specifically, prior to recording the signals are time-expanded; upon reproduction, the signals are time-compressed and the tape is passed about the scanning drum at an angle of over 180°.

The method and system has the advantage that the entire stream of data can be subdivided on two channels, while yet permitting recording in any one channel at a rate of data transfer, per unit time, which is acceptable, and then correcting for the expanded rate by time compression upon reproduction.

DRAWINGS

FIG. 3, in graphs a to d, is a series of time diagrams illustrating the signals being recorded; and FIG. 4 is a schematic circuit diagram of a time transformation circuit.

Figure 1A:
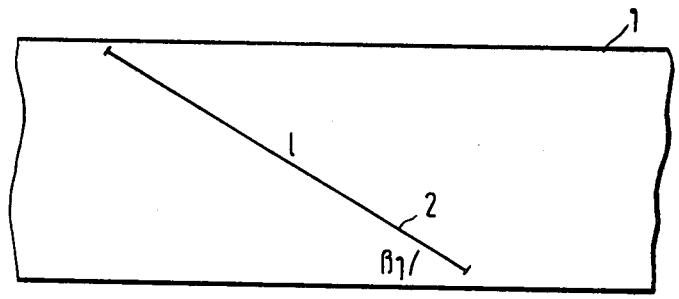
FIG. 1a is a schematic representation of recorded track on magnetic tape in accordance with the prior art.
Figure 1B:
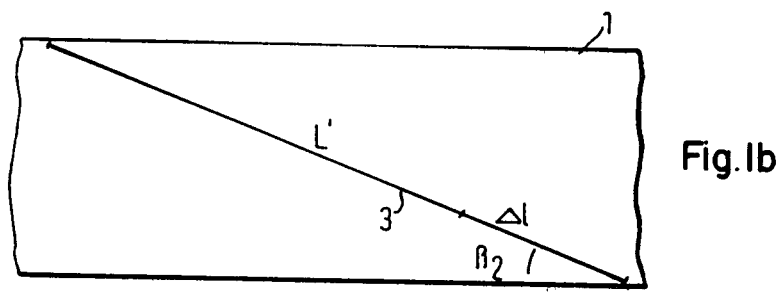
FIG. 1b is a view similar to FIG. 1a, showing the recording in accordance with the present invention.
Figure 2:
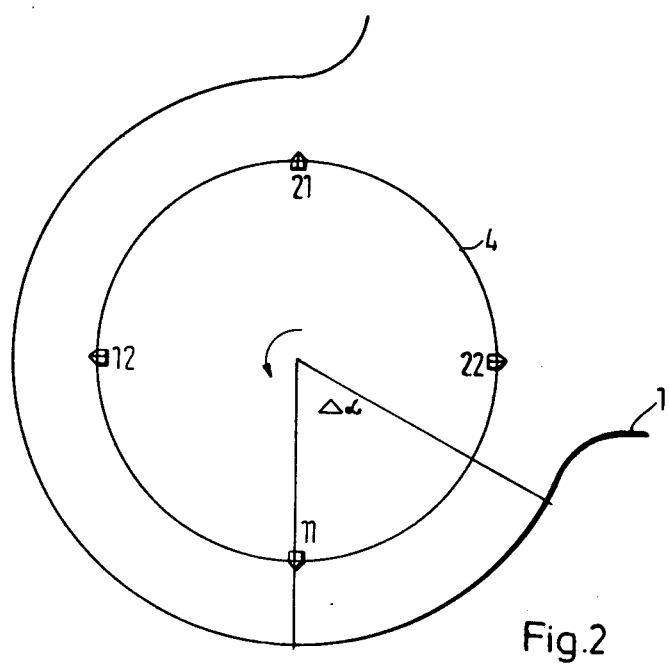
FIG. 2 is a highly schematic view of a head wheel, and the tape looped thereabout.
Figure 3A:
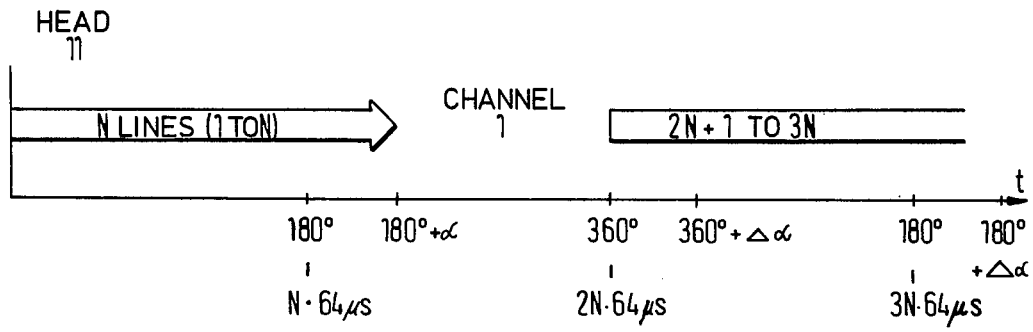
Figure 3B:
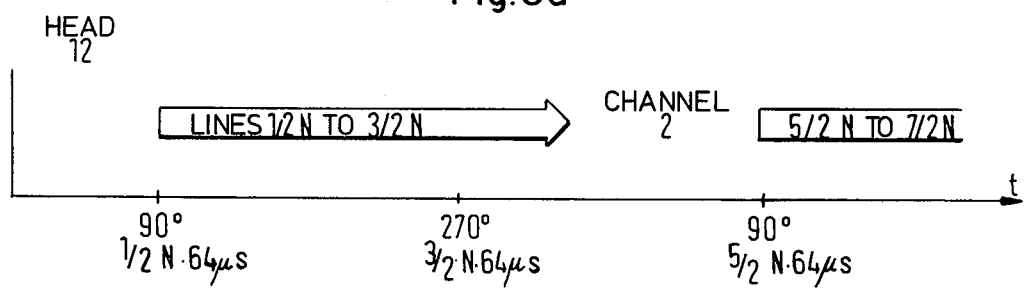
Figure 3C:
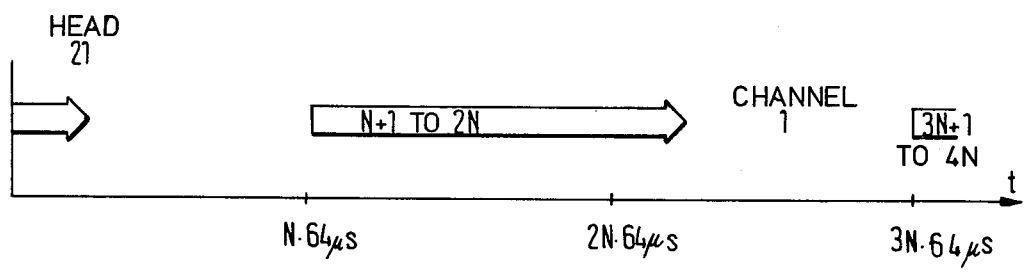
Figure 3D:
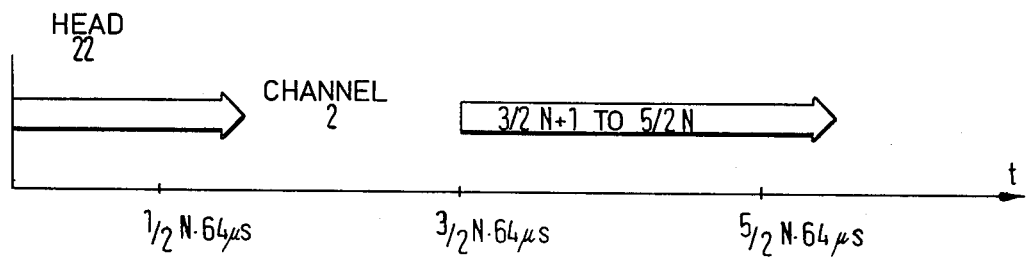

In accordance with well known technology, as illustrated in FIGS. 1a and 2 a magnetic tape 1 is looped about a head wheel carrier or recording cylinder or recording drum, so that a recording track 2 will be formed thereon, having a length L, and extending at an angle $\beta 1$ with respect to the longitudinal edge of the tape. In accordance with the invention, the same quantity of data should have more time for recording available to it, that is, in other words, the track should be longer. As will be explained in detail in connection with FIG. 2, the magnetic tape is carried about the recording head by a distance in excess of that obtainable by a looping angle of 180°. Since the width of the tape is predetermined and standardized, for example 1 inch, the additional length of track can be obtained by changing the angle of the track. As seen in FIG. 1b, the track 3 will have a length L' which is longer by the distance $\Delta L$ than the length L, and extends at an angle $\beta 2$ with respect to the longitudinal edge of the tape 1.

The recording head wheel to carry out this extended recording is shown in FIG. 2; a magnetic tape 1 is looped about a head wheel by an angle $180° + \Delta\alpha$. Magnetic heads 11, 12, 21, 22 are located at the circumference of the head wheel 4. The arrangement of FIG. 2 permits distribution of the digital data on two parallel channels. Two oppositely positioned magnetic heads, each, for example heads 11, 21, are associated with one channel.

The present invention is not limited to use of two channels, but may equally be used with single-channel recording, in which case the head wheel needs only two oppositely positioned heads, rather than four. This is well known, for example, in magnetic recording apparatus for recording analog video signals in accordance with the B-standard.

All elements of the magnetic recording apparatus not necessary for an understanding of the present invention have been omitted. Such elements are well known in the art, and include, for example, tape guide arrangements, further components of the scanning apparatus, an upper and a lower scanning drum, head wheel motors, rotary transducers, and the like; they all may be constructed in accordance with well known technology and as described in the literature.

In accordance with a feature of the invention, the digital information applied to the magnetic heads in two-channel mode is time-expanded. Application of the time-expanded digital information is per track. The temporal relationships are best seen in FIG. 3, in which the time axis—abscissa corresponds to the angular position of the head wheel, and the respective time is entered. N defines that number of video lines which are recorded on any one track. The time indication of 64 microseconds is referenced to the CCIR standard. A corresponding time duration can be used for other television standards.

Heads 11 and 21 form channel 1, which is recorded, alternatingly, with head 11 and head 21 for the time N·64 $\mu$s. Due to the above referred-to time expansion, recording is effected not from one head wheel position of 0° to 180°, but rather $180° + \alpha°$. Head 11 records lines 1 to N, that is, N lines. At the next rotation of the head wheel, head 11 records line 2N to 3N.

The head 21 starts one-half head wheel rotation later to record the lines N+1 to 2N; at the next head wheel rotation it starts at line 3N+1.

Information in the second channel, that is, channel 2, is recorded by the head wheels 12 and 22. As with the signals for channel 1, the signals are time-expanded and distributed to the heads 12 and 22, in which the designation ½N and 3/3N shows the offset of the second head wheel by 90° with respect to the heads of the first group, heads 11 and 21, respectively. The graphs a to d of FIG. 3 illustrate the time relationship.

A suitable time transformation system to carry out the method of the present invention is shown in FIG. 4, in which the figure illustrates such a system for either one of the channels 1 or 2.

The received signals to be recorded are connected to an input terminal 5. Four memories, 6, 7, 8, 9, are provided which receive clock signals of different repetition rate or frequency T1, T2 from inputs 10, 13. The frequency f1 of the clock signal T1 usually corresponds to the clock rate of the received digital TV signal applied to the signal input 5; the clock signal T2 has a different frequency, namely $$f_2 = (f_1)(L)/L + \Delta L$$

The digital input signals and the clock signals are transferred by switches 14,15,16,17,18, and 19 to the memories 6,7,8, and 9. These switches as well as the switches 20 and 24 which are connected to the outputs of the memories are controlled by a control unit 26 which is supplied with suitable pulses derived from a head wheel position transducer. The timing of the control signals generated by the control unit 26 depends on the timing of the signals to be recorded schematically shown in FIG. 3.

The switches are shown in positions which they have during the position of the head wheel between 180° and 180°+α. During the corresponding time interval the memory 6 is connected with the head 11 through the switch 20 and the parallel serial converter 23. Further, memory 6 is controlled by clock pulses $T_2$ via the switch 16. Because switch 19 is in the lower position memory 6 does not get new information. The information of the television lines 1 to N is transferred to head 11. During the same time the transfer of the information of TV lines N+1 to 2N takes place by providing memory 8 with clock pulses $T_2$ via switch 14 and connecting head 21 with the output of the memory 8 by means of switch 24 and a second parallel serial converter 25. During the time interval between the head wheel positions 180° and 180°+α the input 5 is connected to the input of memory 7 by the switch 19. At the same time memory 7 is supplied with clock pulses $T_1$ with the result that the input signals are written into memory 7. Since during this time interval memory 8 works in a read-out mode and memory 9 shall be kept clear to receive data occuring during the next half-revolution switch 15 is in the middle position so that memory 9 does not get any clock pulses. During the third half revolution of the head wheel information of lines 2N+1 to 3N is read out from memory 7. Therefore, switch 20 is brought into the lower position. Memory 6 is disconnected from any clock pulses by switch 16; memory 8 is operated in read-out mode upto the end of the recording of channel 1 (360° plus α), and memory 9 is supplied with clock pulses $T_1$ for storing new information.

Various changes and modifications may be made, and the particular instrumentation illustrated in FIG. 4 is only one example, which is particularly suitable, and preferred, to obtain time transformation. Memories of the first-in, first-out (FIFO) type are particularly suitable for time expansion or time compression, respectively, in which the signals entered can be read in at a certain clock rate, and can be read out or reproduced at a clock rate independent from the input clock rate. Such memories are available as integrated circuits, for example the Texas Instrument 74 SN 225 N.

Time compression of the signals, upon reproduction, can be effected by a structure almost identical to that of FIG. 4, in which, only, the inputs and outputs as well as the clock frequencies have to be interchanged.

I claim:

1. Method of recording video signals on a magnetic tape (1) without exceeding a predetermined bit/unit time recording rate,
   in which the tape (1) is passed in a spiral path about a transducer scanning drum having a rotating head wheel (4) with two transducer heads, spaced 180° apart, which transduce signals on inclined trakcs on the tape,
   comprising, in accordance with the invention,
   prior to recording, transforming the video signals by time expansion,
   passing the tape over the scanning drum wrapped or looped at an angle in excess of 180°;
   wherein the time transformation corresponds to a factor which includes the ratio of the actual wrap angle of the tape to 180°.

2. Method of reproducing video signals which are recorded in time-expanded form on an elongated tape
   in which the tape is passed in a spiral path about a transducer scanning drum having a rotating head wheel (4) with two transducer heads, 180° apart, which transduce signals on inclined tracks on the tape,
   recorded in accordance with the method of claim 1,
   wherein, in accordance with the invention,
   the tape is passed over the scanning drum wrapped or looped at an angle in excess of 180°;
   after reproduction, the signals are time-transformed by time compression to reconstitute the original video signals,
   and wherein the time transformation corresponds to a factor which includes the ratio of the actual wrap angle of the tape to 180°.

3. Method according to claim 1, including the steps of subdividing the digital signals into sections, each one of which corresponds to the time of half-revolution of a head wheel.

4. Video tape transducing system for recording video signals on a magnetic tape (4) without exceeding a predetermined bit/unit time recording rate,
   in which the tape is passed in a spiral path about a transducer scanning drum having a rotating head wheel (4) and at least two transducer heads (11, 21; 12, 22) thereon which transduce signals on inclined tracks (3),
   wherein, in accordance with the invention,
   the tape is guided in its path for transducing by the at least two transducer heads over the scanning drum at a wrap angle of more than 180°;
   a time transformation system (6–9; 10, 13; 14–19; 20; 24; 26) is provided, coupled to each transducer head including clock means (10, 13) for providing clock signals (T1, T2) at respectively different clock rates, and means (14–19) for controlling application of said clock rates for recording of said data to receive the data in the time transformation system at a first clock rate (T1) and record data at a second clock rate (T2);
   and wherein the clock rates of the clock signals provided by the clock means are related by a factor which includes the ratio of the actual wrap angle of the tape about the scanning drum to 180°.

5. System according to claim 4, wherein the head wheel (4) carries two transducer heads (11, 21; 12, 22) for two channels, each, the respective heads associated with any one channel being placed on the head wheel at 180° with respect to each other.

6. System according to claim 4, wherein said time transformation system comprises memory means (6, 7, 8, 9) and the means for controlling application of said clock rates includes switching means (14–19; 24, 20) controlling recording in the respective memory portions of said memory means, and reading-out or retrieval of the recorded data in accordance with first-in, first-out (FIFO) sequencing, at the respectively different clock rates.

7. Method according to claim 2, including the steps of subdividing the digital signals into sections, each one of which corresponds to the time of half-revolution of a head wheel.

8. Apparatus for transducing video signals to or from magnetic tape, without exceeding a predetermined bit-/unit time recording rate in which the tape is passed in a spiral path about a transducer scanning drum having a rotating head wheel (4) and at least two transducer heads (11, 21; 12, 22) thereon which transduce signals on inclined tracks (3), wherein, in accordance with the invention, the tape (1) is guided in its path for transducing by the at least two transducer heads over the scanning drum with a wrap angle of more than 180°, wherein a time transformation system (6–27) is provided connected to and receiving said video signals and provided for each of the transducer heads for time-transforming received signals for recording on the tape in form of inclined tracks, and for re-transforming signals read-out from said inclined tracks on the tape, and including means (10, T1; 13, T2) for controlling the clock rate of signals being received by said time transformation means at a first clock rate and means (T2, 13; T1, 10) for controlling the clock rate of signals being furnished by said time transformation means at a second clock rate;

and wherein the clock rates of the clock signals applied by said clock rate controlling means are related by a factor which includes the ratio of the actual wrap angle of the tape about the transducer drum and 180°.

9. Video tape transducing system for reading-out video signals on a magnetic tape (4), in which the tape is passed in a spiral path about a transducer scanning drum having a rotating head wheel (4) and at least two transducer heads (11, 21; 12, 22) thereon which transduce signals on the tape in inclined tracks (3), wherein, in accordance with the invention, the tape is guided in its path for transducing by the at least two transducer heads over the scanning drum at a wrap angle of more than 180°;

a time transformation system (6–9; 10, 13; 14–19; 20; 24; 26) is provided, coupled to each transducer head including clock means (10, 13) for providing clock signals (T1, T2) at respectively different clock rates, and means (14–19) for controlling application of said clock rates for reading-out of said data to provide output of said data at a first clock rate (T1) and, after reading-out of the data, at a second clock rate (T2);

and wherein the clock rates of the clock signals provided by the clock means are related by a factor which includes the ratio of the actual wrap angle of the tape about the scanning drum to 180°.

* * * * *